(12) United States Patent
Reece et al.

(10) Patent No.: US 9,912,647 B2
(45) Date of Patent: Mar. 6, 2018

(54) VEHICLE WIRELESS INTERNET SECURITY

(71) Applicant: International Business Machines Corporation, Armonk, NY (US)

(72) Inventors: Stuart J. Reece, Winchester (GB); Matthew S. Shaw, Chandler's Ford (GB)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 14/805,511

(22) Filed: Jul. 22, 2015

(65) Prior Publication Data
US 2017/0026354 A1    Jan. 26, 2017

(51) Int. Cl.
| | |
|---|---|
| H04L 29/06 | (2006.01) |
| H04L 29/08 | (2006.01) |
| H04W 4/02 | (2009.01) |
| H04W 12/04 | (2009.01) |
| H04W 12/08 | (2009.01) |
| H04W 48/18 | (2009.01) |
| H04W 76/02 | (2009.01) |

(52) U.S. Cl.
CPC ............ *H04L 63/062* (2013.01); *H04L 67/12* (2013.01); *H04W 4/027* (2013.01); *H04W 4/028* (2013.01); *H04W 12/04* (2013.01); *H04W 12/08* (2013.01); *H04W 76/02* (2013.01)

(58) Field of Classification Search
CPC ...... H04L 63/062; H04L 67/12; H04W 4/027; H04W 4/028; H04W 12/04; H04W 12/08; H04W 48/18; H04W 76/02
USPC ........................................................ 713/171
See application file for complete search history.

(56) References Cited

U.S. PATENT DOCUMENTS 5,303,393 A * 4/1994 Noreen ............. H04B 7/18523
                                                    455/12.1
8,340,694 B2   12/2012 Forstall et al.
8,598,984 B2   12/2013 Chhabra et al.
(Continued)

FOREIGN PATENT DOCUMENTS

CN    103297220 A    9/2013
EP      1696626 B1    1/2015

OTHER PUBLICATIONS

Amdouni et al., "On the Feasibility of Vehicle-to-Internet Communications using Unplanned Wireless Networks", 2010 17th International Conference on Telecommunications, © 2009 IEEE, pp. 393-400.
(Continued)

*Primary Examiner* — Kambiz Zand
*Assistant Examiner* — Benjamin Kaplan
(74) *Attorney, Agent, or Firm* — Edward J. Wixted, III

(57) ABSTRACT

Methods, systems, and computer program products for vehicle wireless internet security are provided. A connection request is received from a mobile device. A data request is transmitted to the mobile device. The data request includes a request for location-based data of the mobile device. A first data is received from the mobile device that corresponds to the data request. A vehicle data is generated that comprises location-based data of the vehicle. A match between the first data and the vehicle data is determined. A match is determined where the location based data of the mobile device is with a pre-determined threshold of the location-based data of the vehicle.

17 Claims, 3 Drawing Sheets

(56) References Cited

U.S. PATENT DOCUMENTS

| | | | |
|---|---|---|---|
| 8,806,202 B2 | 8/2014 | Shoemake et al. | |
| 8,831,224 B2 | 9/2014 | Bai et al. | |
| 9,079,497 B2 | 7/2015 | Ricci | |
| 9,387,813 B1 * | 7/2016 | Moeller | B60R 11/04 |
| 2007/0087763 A1 | 4/2007 | Budampati et al. | |
| 2013/0310064 A1 | 11/2013 | Brachet et al. | |
| 2015/0038073 A1 | 2/2015 | Vang et al. | |
| 2016/0143028 A1 * | 5/2016 | Mancuso | H04W 12/00 370/338 |

OTHER PUBLICATIONS

Bikos et al., "LTE/SAE Security Issues on 4G Wireless Networks", Abstract, IEEE computer society, Issue No. 02—Mar.-Apr. 2013 vol. 11, p. 1-2, <http://www.computer.org/csdl/mags/sp/2013/02/msp2013020055-abs.html>.

Chen et al., "The answer is rolling on wheels: Modeling and performance evaluation of in-cabin Wi-Fi communications", Abstract, Vehicular Communications Nov. 2014; 2(1). DOI: 10.1016/j.vehcom.2014.10.001, p. 1-2, <http://www.researchgate.net/publication/268749731_The_answer_is_rolling_on_wheels_Modeling_and_performance_evaluation_of_in-cabin_Wi-Fi_communications>.

Dressler et al., "Inter-Vehicle Communication: Quo Vadis", IEEE Communications Magazine, Jun. 2014, pp. 170-177, © 2014 IEEE.

Hunting, Benjamin, "GM's 4G LTE Mobile Internet Poses Cost and Security Concerns", Blog, Oct. 17, 2014, pp. 1-3, <http://www.guideautoweb.com/en/articles/26964/gm%27s_4g_lte_mobile_internet_poses_cost_and_security_concerns/>.

"Chevrolet Is the First and Only Car Company to Bring Built-In 4G LTE Wi-Fi to Cars, Trucks and Crossovers", printed on Apr. 10, 2015, pp. 1-7, <http://www.chevrolet.com/culture/article/4g-lte.html>.

* cited by examiner

VEHICLE WIRELESS INTERNET SECURITY

BACKGROUND OF THE INVENTION

The present invention relates generally to the field of wireless network security, and more particularly to vehicle wireless network security enhancements.

Wireless networks are used to link two or more devices using a wireless communication method within a limited area. Wireless networks give users the ability to move around within a local coverage area and still be connected to the network. Often, wireless network access points are provided by a router. The router can require a user to input a security key to access the network.

Access points to wireless networks are increasing. For example, some motor vehicles are equipped with infrastructure to provide wireless network access. Wireless network access within a motor vehicle can be used by passengers to access the network on a mobile device. Further, wireless network access can be used to expand the vehicles amenities. For example, network access can be used to stream music over a stereo.

SUMMARY

According to one embodiment of the present invention, a method for securing wireless internet in a vehicle is provided. The method includes receiving a connection request from a mobile device; transmitting a data request to the mobile device, wherein the data request comprises a request for location-based data of the mobile device; receiving a first data from the mobile device, wherein the first data corresponds to the data request; generating a vehicle data, wherein the vehicle data comprises location-based data of the vehicle; and determining whether the first data matches the vehicle data, wherein a match is determined where the location-based data of the mobile device is within a pre-determined threshold of the location-based data of the vehicle.

According to another embodiment of the present invention, a computer program product for securing wireless internet in a vehicle is provided. The computer program product comprises a computer readable storage medium and program instructions stored on the computer readable storage medium. The program instructions include program instructions to receive a connection request from a mobile device; program instructions to transmit a data request to the mobile device, wherein the data request comprises a request for location-based data of the mobile device; program instructions to receive a first data from the mobile device, wherein the first data corresponds to the data request; program instructions to generate a vehicle data, wherein the vehicle data comprises location-based data of the vehicle; and program instructions to determine whether the first data matches the vehicle data, wherein a match is determined where the location-based data of the mobile device is within a pre-determined threshold of the location-based data of the vehicle.

According to another embodiment of the present invention, a computer system for securing wireless internet in a vehicle is provided. The computer system includes one or more computer processors, one or more computer readable storage media, and program instructions stored on the computer readable storage media for execution by at least one of the one or more processors. The program instructions include program instructions to receive a connection request from a mobile device; program instructions to transmit a data request to the mobile device, wherein the data request comprises a request for location-based data of the mobile device; program instructions to receive a first data from the mobile device, wherein the first data corresponds to the data request; program instructions to generate a vehicle data, wherein the vehicle data comprises location-based data of the vehicle; and program instructions to determine whether the first data matches the vehicle data, wherein a match is determined where the location-based data of the mobile device is within a pre-determined threshold of the location-based data of the vehicle.

DETAILED DESCRIPTION

An embodiment of the present invention recognizes the need for secure wireless network connections where new points of access are created. Wireless network access in motor vehicles is a new point of access. Currently, access to wireless networks in vehicles is controlled by security keys, such as those used for home and business routers. Where passengers of a vehicle are frequently changing (e.g., taxis or buses) traditional security keys can be difficult to distribute efficiently. In some cases, vehicle network access may default to unsecured access to avoid the difficulties of distributing a security key. In these cases, network access is left unsecured.

An embodiment of the present invention provides wireless network security without the need for a security key. An embodiment of the present invention uses velocity information from a vehicle and a mobile device to secure the wireless network. The velocity of a mobile device is compared to the velocity of a vehicle to determine whether the mobile device is being used by a passenger located in the vehicle or by a user located outside of the vehicle. Network access can be granted to a mobile device based on a determination that mobile device is located within the vehicle.

Figure 1:
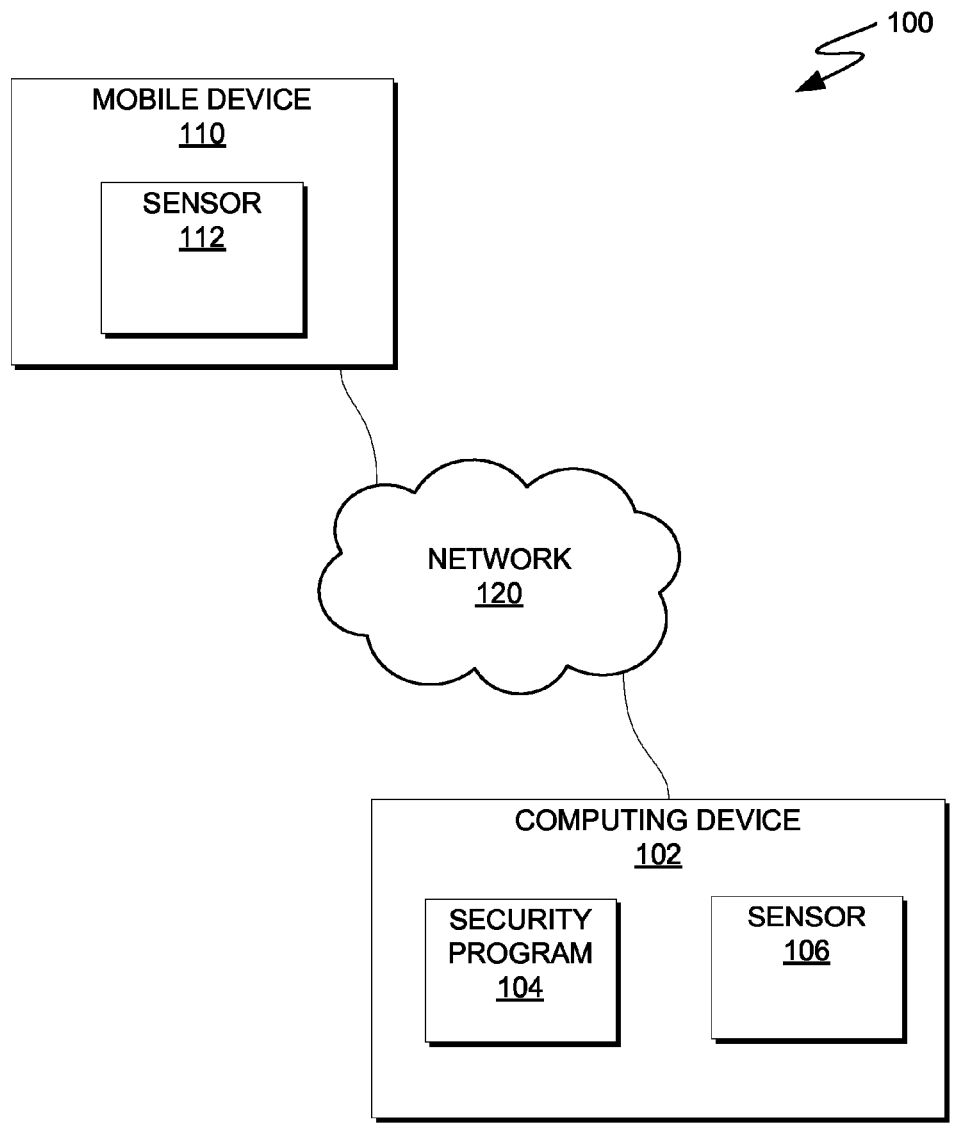
FIG. 1 is a functional block diagram illustrating a computing environment, in accordance with an embodiment of the present invention.

The present invention will now be described in detail with reference to the Figures. FIG. 1 is a functional block diagram illustrating a computing environment, in accordance with an embodiment of the present invention. For example, FIG. 1 is a functional block diagram illustrating computing environment 100. Computing environment 100 includes computing device 102 and mobile device 110 connected over network 120. Computing device 102 includes security program 104 and sensor 106.

In various embodiments, computing device 102 is a computing device that can be a standalone device, a server, a laptop computer, a tablet computer, a netbook computer, a personal computer (PC), or a desktop computer. In another embodiment, computing device 102 represents a computing system utilizing clustered computers and components to act as a single pool of seamless resources. In general, computing device 102 can be any computing device or a combination of devices with access to mobile device 110, and with access to and/or capable of executing security program 104 and sensor 106. Computing device 102 may include internal and external hardware components, as depicted and described in further detail with respect to FIG. 3. In some embodiments, computing device 102 is located within a motor vehicle. In some embodiments, computing device 102 is or comprises a network routing device.

In some embodiments, security program 104 is stored on computing device 102. In other embodiments, security program 104 may reside on another computing device, provided that it can access and is accessible by each of mobile device 110, network 120, and sensor 106. In yet other embodiments, one or both of security program 104 and sensor 106 may be stored or reside externally and may be accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between computing device 102 and mobile device 110, in accordance with a desired embodiment of the present invention.

Security program 104 operates to regulate wireless network access of mobile devices through a router located within a vehicle. Security program 104 receives limited interaction from mobile device 110. The limited interaction includes a request to connect to a local area network (not shown) and exchange of various security credentials. For example, security credentials can include a security key, velocity data of mobile device 110, or historical velocity data of mobile device 110. In some embodiments, security program 104 receives data from sensor 106, sensor 112, or both. Security program 104 uses the data from sensor 106 and mobile device 110 to permit or deny mobile device 110 to access the local area network. Mobile device 110 and computing device 102 wirelessly communicate via network 120. In one embodiment, computing device 102 grants or denies access of mobile device 110 to a network other than network 120 (e.g., a wide area network or the Internet). In another embodiment, computing device 102 grants or denies access of mobile device 110 to resources of network 120 other than computing device 102 (e.g., other mobile devices or local area network resources).

In some embodiments, security program 104 is used to generate revenue for a taxi or public transportation. For example, passengers are offered network access for a fee. If a passenger agrees to pay the fee, the driver can enable security program 104 to allow the passenger to access the network. Where the passenger does not agree to pay the fee or after a paying passenger leaves the vehicle, security program 104 can be disabled, preventing other mobile devices from accessing the network.

Sensor 106 operates to determine information of the vehicle. Sensor 106 may provide the sensor data to security program 104. In some embodiments, sensor 106 is a global positioning device (GPS) that determines a location of the vehicle at multiple points in time, based on which sensor 106 may determine the speed and direction of the vehicle. In some embodiments, sensor 106 determines an acceleration of the vehicle. In one embodiment, sensor 106 gathers vehicle sensor data in real time. In some embodiments, data collected from sensor 106 is stored to a database of computing device 102. In these embodiments, the collected data is used as historical velocity data of computing device 102.

In some embodiments, historical velocity data includes the length or duration of travel. For example, the historical velocity data reflects that the vehicle has been in motion for a certain duration of time or, in another example, a certain distance.

In various embodiments of the present invention, mobile device 110 can be a laptop computer, a tablet computer, a netbook computer, a personal computer (PC), a desktop computer, a personal digital assistant (PDA), a smart phone, or any programmable electronic device capable of communicating with computing device 102 via network 120. Mobile device 110 includes sensor 112.

Sensor 112 operates to determine location information of mobile device 110. Sensor 112 may provide, directly or indirectly, the sensor data to security program 104. In some embodiments, sensor 112 is a global positioning device (GPS) that determines a location of mobile device 110 at multiple points in time, based on which sensor 112 may determine the speed and direction (i.e., the velocity) of mobile device 110. In some embodiments, sensor 112 determines an acceleration of mobile device 110. In one embodiment, sensor 112 gathers sensor data of mobile device 110 in real time. In some embodiments, data collected from sensor 112 is stored to a database. In these embodiments, the collected data is used as historical velocity data of mobile device 110. In some embodiments, historical velocity data includes the length or duration of travel. For example, the historical velocity data reflects that the mobile device has been in motion for a certain duration of time or, in another example, a certain distance.

Figure 2:
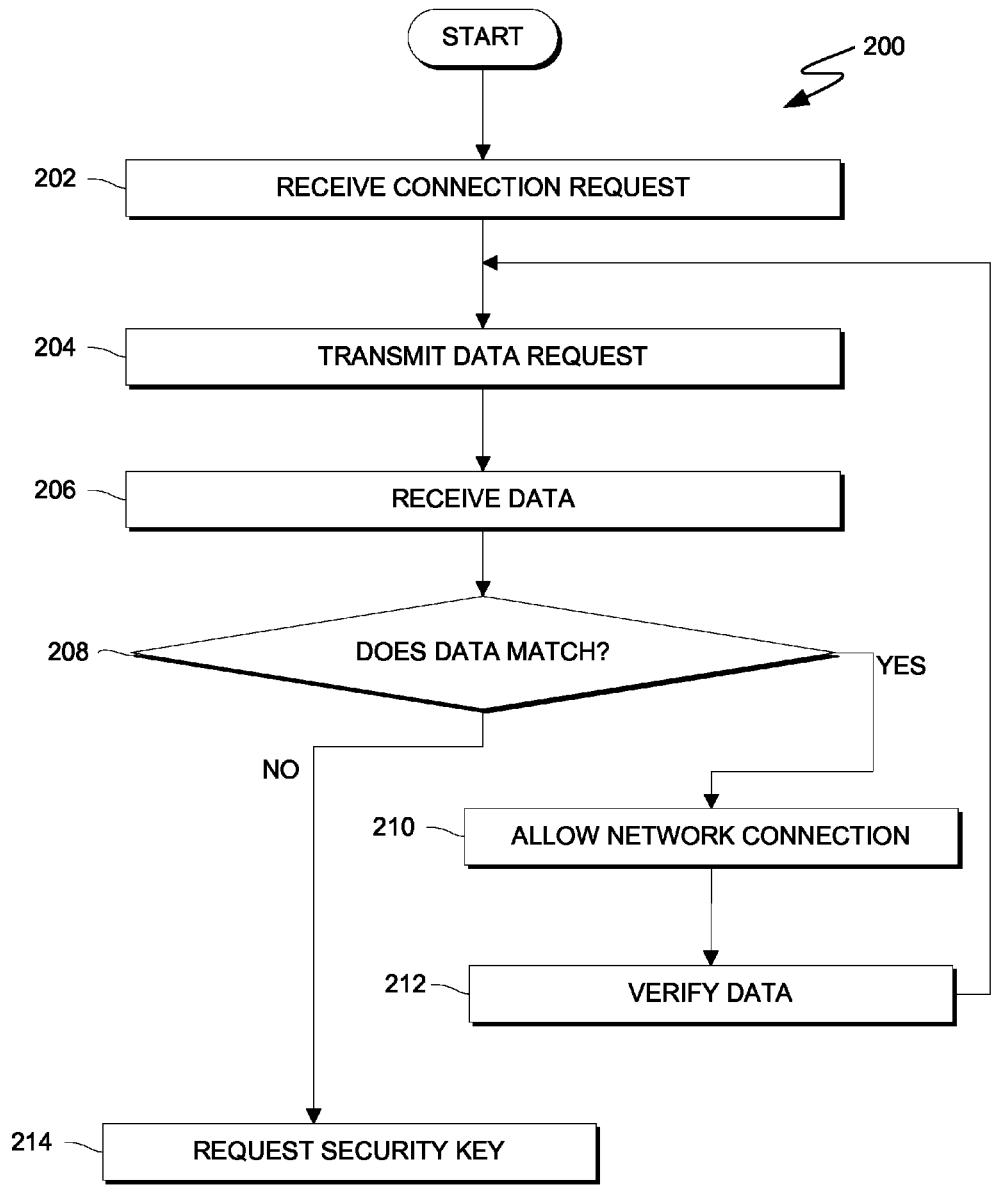
FIG. 2 is a flowchart depicting operations for enhancing vehicle internet security, on a computing device within the computing environment of FIG. 1, in accordance with an embodiment of the present invention.

FIG. 2 is a flowchart depicting operations for enhancing vehicle network security, on a computing device within the computing environment of FIG. 1, in accordance with an embodiment of the present invention. For example, FIG. 2 is a flowchart depicting operations 200 of security program 104, on computing device 102 within computing environment 100.

In step 202, security program 104 receives a connection request from a mobile device (e.g., mobile device 110). In some embodiments, the connection request is in response to the mobile device attempting to access a wireless network. For example, a user of mobile device 110 attempts to connect to the network through network settings on mobile device 110. In some embodiments, the mobile device has limited access to the network (e.g., network 120) until security program 104 authenticates the security of the mobile device using operations 200. For example, mobile device 110 is limited to communicating connection requests and data requested by security program 104. In another example, security program 104 limits access of mobile device 110 to a network resource indicating that mobile device 110 is not authorized to access the network.

In step 204, security program 104 transmits a data request to the mobile device. In some embodiments, the data request is for the real time velocity of the mobile device. For example, the velocity is determined by GPS sensor in mobile device 110. In other embodiments, security program 104 requests historical velocity data. For example, security program 104 requests velocity data from mobile device 110 for a predetermined period prior to the request (e.g., 30 seconds). In some embodiments, the predetermined period is configurable. In some embodiments, historical velocity data is used where the vehicle is at rest (e.g., at a stop light). In other embodiments, historical velocity data is used where there is a high likelihood that surrounding vehicles are traveling at the same velocity (e.g., rush-hour traffic), where a mobile device in a neighboring vehicle might try to access the vehicles network.

In step 206, security program 104 receives data from the mobile device. In some embodiments, the data is the real time velocity of the mobile device as determined by a sensor in the mobile device. In some embodiments, the data includes a timestamp that indicates when the data was collected from the sensor. In other embodiments, the data received is historical velocity data that indicates the velocity of the mobile device over a time period.

In decision 208, security program 104 determines whether the received data matches vehicle data. For example, a sensor located within (or affixed to) the vehicle determines the vehicle's velocity, acceleration, etc. In another example, security program 104 determines the vehicle's velocity, acceleration, etc. based on sensor data of sensor 106. In some embodiments, this data is stored to be used as historical velocity data of the vehicle. Security program 104 compares the data received from the mobile device with the data of the vehicle's sensor. If security program 104 determines that the received data matches the data from the vehicle sensor (decision 208, YES branch), then security program 104 connects the mobile device to the network. In one embodiment, the match must be within a specified threshold. For example, the velocity must be in the same direction (e.g., within a predetermined number of degrees) and within a specified mile per hour range (e.g., within one mile per hour). In another example, the mobile device must be located with a predetermined proximity of computing device 102 at one or more times. If security program 104 determines that the received data does not match the data from the vehicle sensor (decision 208, NO branch), then security program 104 prompts the user of the mobile device for a security key (step 214).

In some embodiments, security program 104 determines whether the received data matches vehicle data based on a path of travel of mobile device 110 and a path of travel of computing device 102. In such embodiments, historical velocity data of computing device 102 includes coordinates and timestamps reflecting the location of computing device 102 at various times. Similarly, historical velocity data of mobile device 110 includes coordinates and timestamps reflecting the location of mobile device 110 at various times. Security program 104 models a path of travel for each of computing device 102 and mobile device 110 based on the locations of each at various times. Security program 104 determines that the received data (i.e., the data corresponding to mobile device 110) matches the vehicle data (i.e., the data corresponding to the computing device 102) by comparing the paths of travel to one another using one or more linear algebra techniques. For example, security program 104 determines that the data match if a difference (e.g., a Fréchet distance or a Hausdorff distance) between the two paths of travel is below a predetermined threshold.

In step 210, security program 104 allows the mobile device to connect to the network. In some embodiments, security program 104 allows the mobile device to connect to a WAN such as the Internet. In other embodiments, security program 104 allows the mobile device to connect to a local network. In some embodiments, security program 104 connects the mobile device to a payment gateway via which a user of the mobile device may provide payment information. In response to receiving such payment information, security program 104 allow the mobile device to access the network.

In step 212, security program 104 verifies the data. Security program 104 verifies the data to determine whether the mobile device should retain access to the network. In one embodiment, security program 104 verifies the data by returning to step 204 in order to request updated sensor data from the mobile device. In some embodiments, security program 104 intermittently verifies that the mobile device is located within the vehicle. In some embodiments, the verification is done at set intervals (e.g., verification is done every twenty minutes). For example after security program 104 allows a network connection of a mobile device (see step 210), security program 104 verifies the data of the mobile device in response to a predetermined duration of time elapsing. In this example, security program 104 verifies the data by requesting updated sensor data (step 204). In another embodiment, security program 104 verifies the data of the mobile device in response to detecting a change in acceleration and/or velocity of the vehicle. For example, in response to detecting that the vehicle is no longer stationary, security program 104 verifies the data of one or more mobile devices for which network connections were previously allowed (step 212) by requesting updated sensor data from the mobile device (step 204)

In step 214, security program 104 requests a security key. In some embodiments, where security program 104 is unable to authenticate the security of a mobile device through operations 202 through 212, security program 104 prompts the mobile device for a security key. In one embodiment, security program 104 allows a mobile device to connect if (and only if) the mobile device provides a security key that satisfies the challenge of security program 104. In various examples, the security key may be a password, token, digital certificate, or other authorization technique. In some embodiments, security program 104 allows a network connection of a mobile device authentication via security key indefinitely. In one embodiment, security program 104 terminates network connections of mobile devices authenticated via security key in response to a change in the predetermined security key (e.g., by the vehicle owner).

Figure 3:
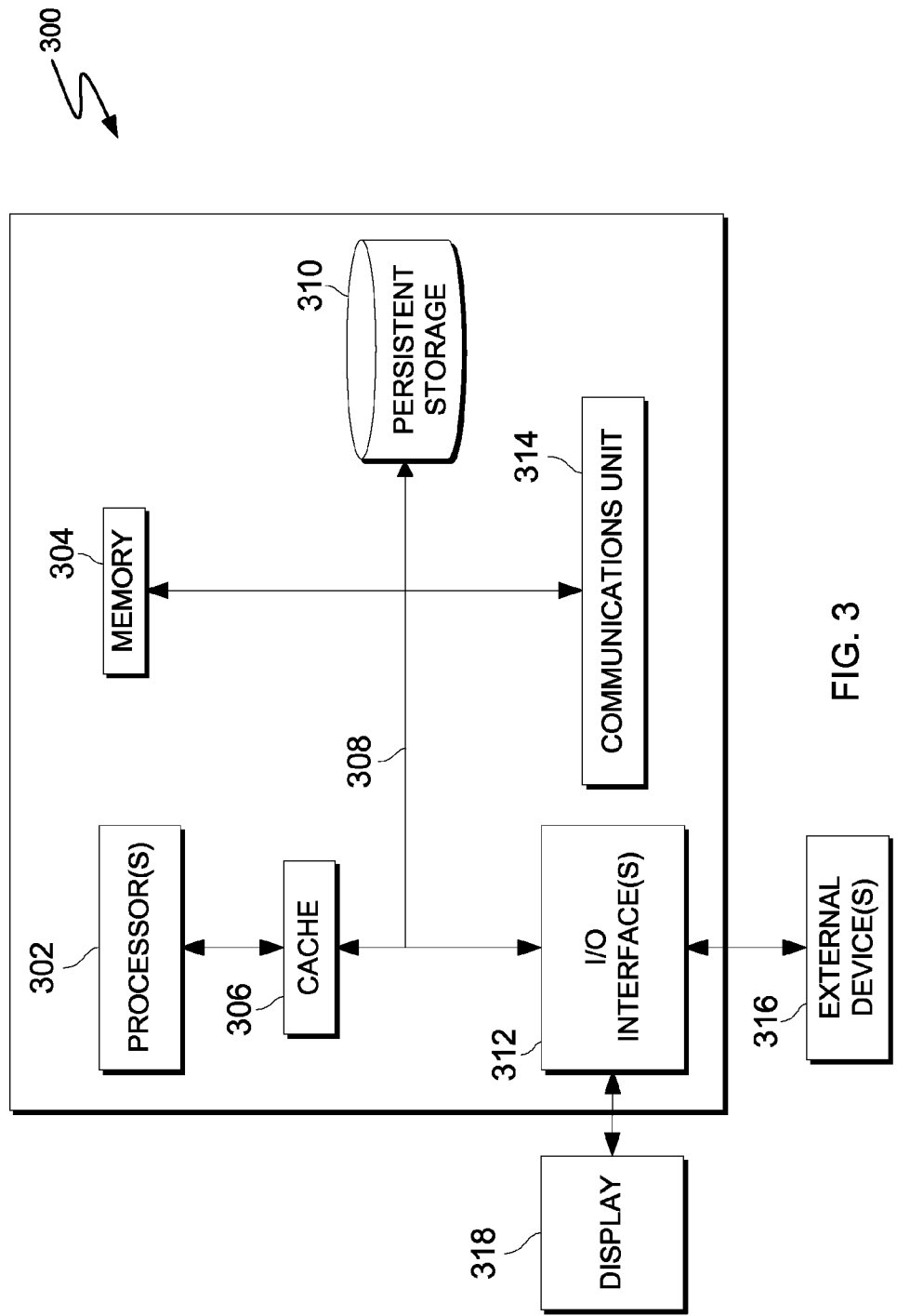
FIG. 3 is a block diagram of components of a computing device executing operations for enhancing vehicle internet security, in accordance with an embodiment of the present invention.

FIG. 3 is a block diagram of components of a computing device, generally designated 300, in accordance with an embodiment of the present invention. In one embodiment, computing device 300 is representative of computing device 102. For example, FIG. 3 is a block diagram of computing device 102 within computing environment 100 executing operations of sub-string searching program 104.

It should be appreciated that FIG. 3 provides only an illustration of one implementation and does not imply any limitations with regard to the environments in which different embodiments may be implemented. Many modifications to the depicted environment may be made.

Computing device 300 includes communications fabric 308, which provides communications between computer processor(s) 302, memory 304, cache 306, persistent storage 310, communications unit 314, and input/output (I/O) interface(s) 312. Communications fabric 308 can be implemented with any architecture designed for passing data and/or control information between processors (such as microprocessors, communications and network processors, etc.), system memory, peripheral devices, and any other hardware components within a system. For example, communications fabric 308 can be implemented with one or more buses.

Memory 304 and persistent storage 310 are computer-readable storage media. In this embodiment, memory 304 includes random access memory (RAM). In general, memory 304 can include any suitable volatile or non-volatile computer readable storage media. Cache 306 is a fast memory that enhances the performance of processors 302 by holding recently accessed data, and data near recently accessed data, from memory 304.

Program instructions and data used to practice embodiments of the present invention may be stored in persistent storage 310 and in memory 304 for execution by one or more of the respective processors 302 via cache 306. In an embodiment, persistent storage 310 includes a magnetic hard disk drive. Alternatively, or in addition to a magnetic hard disk drive, persistent storage 310 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 310 may also be removable. For example, a removable hard drive may be used for persistent storage 310. Other examples include optical and magnetic disks, thumb drives, and smart cards that are inserted into a drive for transfer onto another computer-readable storage medium that is also part of persistent storage 310.

Communications unit 314, in these examples, provides for communications with other data processing systems or devices, including resources of network 120. In these examples, communications unit 314 includes one or more network interface cards. Communications unit 314 may provide communications through the use of either or both physical and wireless communications links. Program instructions and data used to practice embodiments of the present invention may be downloaded to persistent storage 310 through communications unit 314.

I/O interface(s) 312 allows for input and output of data with other devices that may be connected to computing device 300. For example, I/O interface 312 may provide a connection to external devices 316 such as a keyboard, keypad, a touch screen, and/or some other suitable input device. External devices 316 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 310 via I/O interface(s) 312. I/O interface(s) 312 also connect to a display 318.

Display 318 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more processors, a connection request from a mobile device;
   transmitting, by one or more processors, a data request to the mobile device, wherein:
      the data request comprises a request for location-based data of the mobile device; and
      the location-based data of the mobile device includes a velocity of the mobile device;
   receiving, by one or more processors, a first data from the mobile device, wherein the first data corresponds to the data request;
   generating, by one or more processors, a vehicle data, wherein:
      the vehicle data comprises location-based data of the vehicle; and
      the location-based data of the vehicle includes a velocity of the vehicle;
   determining, by one or more processors, whether the first data matches the vehicle data, wherein a match is determined where the location-based data of the mobile device is within a pre-determined threshold of the location-based data of the vehicle; and
   in response to determining that the first data matches the vehicle data, connecting, by one or more processors, the mobile device to a network.

2. The method of claim 1, further comprising:
   in response to determining that a second vehicle data does not match a third data from a second mobile device, prompting, by one or more processors, the second mobile device for a security key;
   receiving, by one or more processors, a first security key from the second mobile device; and
   determining, by one or more processors, whether the first security key matches an expected response.

3. The method of claim 2, further comprising:
   in response to determining that the first security key matches the expected response, allowing, by one or more processors, the second mobile device to connect to the network.

4. The method of claim 2, further comprising:
   in response to determining that the first security key does not match the expected response, blocking, by one or more processors, access of the second mobile device to the network.

5. The method of claim 1, further comprising:
   re-authenticating, by one or more processors, the mobile device, by:
      transmitting, by one or more processors, a second data request from the mobile device, wherein the second data request comprises a request for an updated velocity of the mobile device;
      receiving, by one or more processors, a second data from the mobile device, wherein the second data corresponds to the second data request;
      re-generating, by one or more processors, the vehicle data, including generating an updated velocity of the vehicle; and
      determining, by one or more processors, whether the second data matches the vehicle data based, at least in part, on the updated velocity of the mobile device and updated velocity of the vehicle.

6. The method of claim 5, wherein re-authenticating the mobile device is in response to determining that an acceleration of the vehicle is not equal to zero.

7. The method of claim 1, wherein the location-based data of the mobile device further includes historical velocity data of the mobile device and wherein the location-based data of the vehicle further includes historical velocity data of the vehicle, wherein each historical velocity data includes a plurality of locations and corresponding timestamps.

8. A computer program product, the computer program product comprising:
   a computer readable storage medium and program instructions stored on the computer readable storage medium, the program instructions comprising:
   program instructions to receive a connection request from a mobile device;

program instructions to transmit a data request to the mobile device, wherein:
the data request comprises a request for location-based data of the mobile device; and
the location-based data of the mobile device includes a velocity of the mobile device;
program instructions to receive a first data from the mobile device, wherein the first data corresponds to the data request;
program instructions to generate a vehicle data, wherein:
the vehicle data comprises location-based data of the vehicle; and
the location-based data of the vehicle includes a velocity of the vehicle;
program instructions to determine whether the first data matches the vehicle data, wherein a match is determined where the location-based data of the mobile device is within a pre-determined threshold of the location-based data of the vehicle; and
program instructions to, in response to determining the first data matches the vehicle data, connect the mobile device to a network.

9. The computer program product of claim 8, further comprising;
program instructions to, in response to determining that a second vehicle data does not match a third data from a second mobile device, prompt the second mobile device for a security key;
program instructions to receive a first security key from the second mobile device; and
program instructions to determine whether the first security key matches an expected response.

10. The computer program product of claim 9, further comprising:
program instructions to, in response to determining that the first security key matches the expected response, allow the second mobile device to connect to the network.

11. The computer program product of claim 8, further comprising:
program instructions to re-authenticate the mobile device, by:
program instructions to transmit a second data request from the mobile device, wherein the second data request comprises a request for an updated velocity of the mobile device;
program instructions to receive a second data from the mobile device, wherein the second data corresponds to the second data request;
program instructions to re-generate the vehicle data, including generating an updated velocity of the vehicle; and
program instructions to determine whether the second data matches the vehicle data based, at least in part, on the updated velocity of the mobile device and updated velocity of the vehicle.

12. The computer program product of claim 11, wherein re-authenticating the mobile device is in response to determining that an acceleration of the vehicle is not equal to zero.

13. A computer system, the computer system comprising:
one or more computer processors;
one or more computer readable storage media;
program instructions stored on the computer readable storage media for execution by at least one of the one or more processors, the program instructions comprising:
program instructions to receive a connection request from a mobile device;
program instructions to transmit a data request to the mobile device, wherein:
the data request comprises a request for location-based data of the mobile device; and
the location-based data of the mobile device includes a velocity of the mobile device;
program instructions to receive a first data from the mobile device, wherein the first data corresponds to the data request;
program instructions to generate a vehicle data, wherein:
the vehicle data comprises location-based data of the vehicle; and
the location-based data of the vehicle includes a velocity of the vehicle;
program instructions to determine whether the first data matches the vehicle data, wherein a match is determined where the location-based data of the mobile device is within a pre-determined threshold of the location-based data of the vehicle; and
program instructions to, in response to determining the first data matches the vehicle data, connect the mobile device to a network.

14. The computer system of claim 13, further comprising;
program instructions to, in response to determining that a second vehicle data does not match a third data from a second mobile device, prompt the second mobile device for a security key;
program instructions to receive a first security key from the second mobile device; and
program instructions to determine whether the first security key matches an expected response.

15. The computer system of claim 14, further comprising:
program instructions to, in response to determining that the first security key matches the expected response, allow the second mobile device to connect to the network.

16. The computer system of claim 13, further comprising:
program instructions to re-authenticate the mobile device, by:
program instructions to transmit a second data request from the mobile device, wherein the second data request comprises a request for an updated velocity of the mobile device;
program instructions to receive a second data from the mobile device, wherein the second data corresponds to the second data request;
program instructions to re-generate the vehicle data, including generating an updated velocity of the vehicle; and
program instructions to determine whether the second data matches the vehicle data based, at least in part, on the updated velocity of the mobile device and updated velocity of the vehicle.

17. The computer system of claim 16, wherein re-authenticating the mobile device is in response to determining that an acceleration of the vehicle is not equal to zero.

* * * * *